(12) United States Patent
Belt et al.

(10) Patent No.: US 11,992,033 B2
(45) Date of Patent: May 28, 2024

(54) PET FOOD

(71) Applicant: MARS, INCORPORATED, McLean, VA (US)

(72) Inventors: Sarah Belt, Yorkshire (GB); Matthew Gosling, Yorkshire (GB); Guy Heath, Yorkshire (GB); Gareth Thomas, Yorkshire (GB)

(73) Assignee: MARS, INCORPORATED, McLean, VA (US)

( * ) Notice: Subject to any disclaimer, the term of this patent is extended or adjusted under 35 U.S.C. 154(b) by 792 days.

(21) Appl. No.: 16/480,029

(22) PCT Filed: Jan. 26, 2018

(86) PCT No.: PCT/GB2018/050231
§ 371 (c)(1),
(2) Date: Jul. 23, 2019

(87) PCT Pub. No.: WO2018/138515
PCT Pub. Date: Aug. 2, 2018

(65) Prior Publication Data
US 2020/0000124 A1   Jan. 2, 2020

(30) Foreign Application Priority Data

Jan. 27, 2017 (GB) .................................... 1701417

(51) Int. Cl.
*A23K 50/45* (2016.01)
*A23K 10/18* (2016.01)
(Continued)

(52) U.S. Cl.
CPC .............. *A23K 50/45* (2016.05); *A23K 10/18* (2016.05); *A23K 10/24* (2016.05); *A23K 20/163* (2016.05); *A23K 20/26* (2016.05); *A23K 40/30* (2016.05)

(58) Field of Classification Search
CPC ..................................................... A23K 10/24
See application file for complete search history.

(56) References Cited

U.S. PATENT DOCUMENTS

| 414,090 A | 10/1889 | Taylor |
| D28,864 S | 6/1898 | Baker |

(Continued)

FOREIGN PATENT DOCUMENTS

| CA | 139848 | 10/2011 | |
| CA | 2805500 | * 2/2012 | ............... A23K 1/18 |

(Continued)

OTHER PUBLICATIONS van Gijssel et al. JP 4503233 Ip.com translation Jul. 14, 2010 7 pages (Year: 2010).*
Del Hoyo et al. Demineralization of animal blood plasma by ion exchange and ultrafiltration Meat Science vol. 76 pp. 402-410 (Year: 2007).*
van gijssel et al. EP1361802A1 2003 (Year: 2003).*
Dr. Foster Smith Catalogue, Dec. 2002, p. 53; Care-A-Lot: Pet Supply Warehouse, Mar. 18, 2002, 2 pp.
"Beef & Cheese Flavor Snausages in a Blanket", Distributed by Del Monte Pet Products, 1 p., downloaded prior to Aug. 12, 2005.

(Continued)

*Primary Examiner* — Felicia C Turner
(74) *Attorney, Agent, or Firm* — Baker Botts L.L.P.

(57) ABSTRACT

An edible pet food, wherein the pet food has a moisture content of 15 to 50 wt % and the pet food comprises a core and a coating disposed on the core, wherein the core comprises animal protein and the pet food has an animal protein content of at least 30 wt %, and at least one of the core and the coating comprises a glucose-containing carbohydrate selected from a dextrin and an esterified starch.

14 Claims, 2 Drawing Sheets

(51) Int. Cl.
  *A23K 10/24* (2016.01)
  *A23K 20/163* (2016.01)
  *A23K 20/26* (2016.01)
  *A23K 40/30* (2016.01)

(56) References Cited

U.S. PATENT DOCUMENTS

| | | |
|---|---|---|
| D47,083 S | 3/1915 | Swaab, Jr. |
| 2,003,578 A | 6/1935 | Clement |
| 2,062,489 A | 12/1936 | Adams |
| D116,547 S | 9/1939 | Arms |
| D127,460 S | 5/1941 | Thomas |
| D132,467 S | 5/1942 | Sabatino |
| 2,659,163 A | 11/1953 | Jerome et al. |
| D178,313 S | 7/1956 | Stark |
| D182,784 S | 5/1958 | Bancroft |
| D185,389 S | 6/1959 | Popovich |
| D191,284 S | 9/1961 | O'Donnell |
| D197,595 S | 3/1964 | Savitt |
| D207,167 S | 3/1967 | Fisher |
| 3,344,457 A | 10/1967 | Grobert |
| 3,384,496 A | 5/1968 | Robinson et al. |
| D212,542 S | 10/1968 | McCarthy |
| D214,659 S | 7/1969 | Cooper et al. |
| 3,527,646 A * | 9/1970 | Jokay .................. A23B 5/06 426/289 |
| D224,077 S | 7/1972 | Duvall et al. |
| D226,595 S | 4/1973 | Caunes |
| D227,226 S | 6/1973 | Bird |
| D228,827 S | 10/1973 | Cammelot et al. |
| D249,723 S | 9/1978 | Cosman |
| D249,724 S | 9/1978 | Cosman |
| D251,509 S | 4/1979 | Wenrick |
| 4,162,333 A | 7/1979 | Nelson et al. |
| D254,336 S | 3/1980 | Miller et al. |
| D254,337 S | 3/1980 | Miller et al. |
| D254,338 S | 3/1980 | Miller et al. |
| D254,339 S | 3/1980 | Miller et al. |
| D267,776 S | 2/1983 | Holgersson et al. |
| D286,919 S | 11/1986 | Flockhart et al. |
| D293,186 S | 12/1987 | Parnham |
| D301,794 S | 6/1989 | Ballerini |
| 5,015,485 A | 5/1991 | Scaglione et al. |
| D323,233 S | 1/1992 | Duffy |
| 5,149,555 A | 9/1992 | Flindall |
| 5,194,283 A | 3/1993 | Dupas et al. |
| D339,899 S | 10/1993 | Kittleson |
| D344,141 S | 2/1994 | Wonderly |
| D353,642 S | 12/1994 | Callaghan |
| 5,500,234 A | 3/1996 | Russo |
| 5,532,010 A | 7/1996 | Spanier et al. |
| D379,244 S | 5/1997 | Wiebe |
| 5,676,987 A | 10/1997 | Lai |
| 5,690,988 A | 11/1997 | Lin et al. |
| 5,731,029 A | 3/1998 | Karwowski et al. |
| D393,335 S | 4/1998 | Bailey |
| 5,795,397 A * | 8/1998 | Shi .................. C09J 103/02 127/29 |
| 5,837,308 A | 11/1998 | Campbell et al. |
| D410,026 S | 5/1999 | Brown et al. |
| 5,899,210 A | 5/1999 | Letherby et al. |
| D410,315 S | 6/1999 | Woodward |
| 5,922,379 A | 7/1999 | Wang et al. |
| 5,947,807 A | 9/1999 | Overseth |
| D415,601 S | 10/1999 | Sherman et al. |
| D416,662 S | 11/1999 | Doyle et al. |
| 5,985,336 A | 11/1999 | Ivey et al. |
| 6,009,682 A | 1/2000 | Lehman et al. |
| 6,013,255 A | 1/2000 | Edens et al. |
| 6,033,715 A | 3/2000 | Lynch et al. |
| 6,056,991 A | 5/2000 | Axelrod |
| 6,077,558 A | 6/2000 | Euber |
| D429,402 S | 8/2000 | Reisman |
| D435,713 S | 1/2001 | Speck |
| D435,955 S | 1/2001 | Speck |
| 6,171,632 B1 | 1/2001 | Gonzalez et al. |
| 6,178,922 B1 | 1/2001 | Denesuk et al. |
| D437,101 S | 2/2001 | Debbouz et al. |
| 6,207,216 B1 | 3/2001 | Zietlow et al. |
| 6,238,715 B1 | 5/2001 | Baikie |
| D444,243 S | 6/2001 | Erwin |
| D445,236 S | 7/2001 | Kirchner et al. |
| 6,277,420 B1 | 8/2001 | Andersen et al. |
| 6,325,859 B1 | 12/2001 | De Roos et al. |
| D459,985 S | 7/2002 | Davis |
| 6,436,463 B1 | 8/2002 | Cheuk et al. |
| 6,440,485 B1 | 8/2002 | Cheuk et al. |
| 6,455,083 B1 | 9/2002 | Wang |
| D473,348 S | 4/2003 | Lang |
| D475,095 S | 5/2003 | Manville |
| 6,582,749 B2 | 6/2003 | Merrick et al. |
| 6,586,027 B2 | 7/2003 | Axelrod et al. |
| D478,705 S | 8/2003 | Dahl et al. |
| 6,634,884 B2 | 10/2003 | Phillips |
| D485,661 S | 1/2004 | Harris |
| D487,951 S | 4/2004 | Lippian et al. |
| 6,767,573 B1 | 7/2004 | Dixon et al. |
| D497,238 S | 10/2004 | Maniak et al. |
| D497,700 S | 10/2004 | Polvilampi |
| D498,571 S | 11/2004 | Lawrenson et al. |
| 6,814,996 B2 | 11/2004 | Murray et al. |
| 6,815,000 B2 | 11/2004 | Kesler |
| D500,579 S | 1/2005 | Tansey et al. |
| D501,700 S | 2/2005 | Turner |
| D503,506 S | 4/2005 | Tepper et al. |
| D503,645 S | 4/2005 | Wirth et al. |
| 6,904,870 B2 | 6/2005 | Russell-Maynard et al. |
| D507,135 S | 7/2005 | Deichmann |
| D508,570 S | 8/2005 | Bouic |
| D509,045 S | 9/2005 | Buckley et al. |
| D512,810 S | 12/2005 | Englisch |
| D514,264 S | 1/2006 | Viola |
| D515,275 S | 2/2006 | Leiweke et al. |
| D515,775 S | 2/2006 | Harrington et al. |
| D516,276 S | 3/2006 | Unlu et al. |
| D517,774 S | 3/2006 | Jia et al. |
| 7,024,712 B2 | 4/2006 | Murotani et al. |
| 7,063,868 B2 | 6/2006 | Axelrod |
| 7,070,827 B2 | 7/2006 | Cavallini et al. |
| D528,261 S | 9/2006 | Mendes et al. |
| D532,583 S | 11/2006 | Townsend et al. |
| D533,973 S | 12/2006 | Kelsoe et al. |
| D534,422 S | 1/2007 | Hallberg |
| D534,706 S | 1/2007 | Cuadrado |
| D535,018 S | 1/2007 | Stawski et al. |
| D536,537 S | 2/2007 | Ping Sheng |
| D536,538 S | 2/2007 | Ping Sheng |
| D538,506 S | 3/2007 | Mendes et al. |
| D539,550 S | 4/2007 | Ping Sheng |
| 7,211,280 B1 | 5/2007 | Young et al. |
| 7,288,275 B2 | 10/2007 | Axelrod et al. |
| 7,332,188 B2 | 2/2008 | Axelrod |
| D578,727 S | 10/2008 | Frawley et al. |
| D583,179 S | 12/2008 | Haile |
| D585,177 S | 1/2009 | Wylie |
| D585,627 S | 2/2009 | Wylie |
| D586,529 S | 2/2009 | Ogg |
| D586,534 S | 2/2009 | Oelsner et al. |
| 7,490,579 B2 | 2/2009 | Axelrod |
| D590,555 S | 4/2009 | Dunshee et al. |
| D591,926 S | 5/2009 | Jia et al. |
| 7,534,422 B2 | 5/2009 | Etayo Garralda et al. |
| 7,534,461 B2 | 5/2009 | Zeller et al. |
| D593,277 S | 6/2009 | Wylie |
| D595,986 S | 7/2009 | Kloes et al. |
| 7,595,076 B2 | 9/2009 | Yoo |
| D603,135 S | 11/2009 | Unlu et al. |
| D603,136 S | 11/2009 | Unlu et al. |
| 7,662,414 B1 | 2/2010 | Lawlor |
| 7,678,406 B2 | 3/2010 | Heydtmann et al. |
| 7,691,315 B2 | 4/2010 | Axelrod |
| 7,691,424 B2 | 4/2010 | Axelrod et al. |
| D614,830 S | 5/2010 | Unlu et al. |
| 7,707,668 B2 | 5/2010 | Kloes et al. |

(56) References Cited

U.S. PATENT DOCUMENTS

| | | | |
|---|---|---|---|
| D618,428 S | 6/2010 | Unlu et al. | |
| 7,842,329 B2 | 11/2010 | Saylock et al. | |
| 7,914,835 B2 | 3/2011 | Baltorinic et al. | |
| D637,439 S | 5/2011 | Mettler | |
| D637,440 S | 5/2011 | Mettler | |
| D641,947 S | 7/2011 | Bruyea et al. | |
| D641,950 S | 7/2011 | Bruyea et al. | |
| D641,953 S | 7/2011 | Bruyea et al. | |
| D644,001 S | 8/2011 | Bruyea et al. | |
| D647,276 S | 10/2011 | Bruyea et al. | |
| 8,057,838 B2 | 11/2011 | Levin | |
| 8,163,320 B2 | 4/2012 | Braun et al. | |
| D658,848 S | 5/2012 | Wylie | |
| D659,837 S | 5/2012 | Oien et al. | |
| 8,257,775 B2 | 9/2012 | Axelrod et al. | |
| 8,263,113 B2 | 9/2012 | Dodd et al. | |
| 8,394,438 B2 | 3/2013 | Axelrod et al. | |
| D684,340 S | 6/2013 | Cox et al. | |
| 8,524,299 B2 | 9/2013 | Brent, Jr. | |
| 8,574,653 B2 | 11/2013 | Barnvos et al. | |
| D695,988 S | 12/2013 | Wurth et al. | |
| 8,628,794 B2 | 1/2014 | Isele | |
| 8,680,161 B2 | 3/2014 | Hitzfeld et al. | |
| 8,765,180 B2 * | 7/2014 | Koehler | A23G 4/20 426/103 |
| 8,776,728 B2 | 7/2014 | Xu et al. | |
| D710,568 S | 8/2014 | Fox | |
| 8,809,398 B2 | 8/2014 | Kopsel et al. | |
| 8,875,663 B2 | 11/2014 | Axelrod et al. | |
| 8,912,237 B2 | 12/2014 | Voelker | |
| D722,449 S | 2/2015 | Krishtul | |
| 9,107,867 B2 | 8/2015 | Zanghi et al. | |
| 9,295,277 B2 | 3/2016 | Chang et al. | |
| D755,543 S | 5/2016 | Upadhyay | |
| 9,332,777 B2 | 5/2016 | Hitzfeld et al. | |
| 9,357,796 B2 | 6/2016 | Musaeus et al. | |
| 9,380,802 B2 | 7/2016 | Andersen et al. | |
| 9,388,108 B2 | 7/2016 | Le-Thiesse | |
| D765,515 S | 9/2016 | Angellotti et al. | |
| D768,353 S | 10/2016 | Niehues et al. | |
| D769,574 S | 10/2016 | Peterson et al. | |
| D771,348 S | 11/2016 | Traynor et al. | |
| 9,480,275 B2 * | 11/2016 | Brent, Jr. | A23K 50/45 |
| 9,506,099 B2 | 11/2016 | Nikolic et al. | |
| 9,713,338 B2 | 7/2017 | Mahe et al. | |
| 9,737,054 B2 | 8/2017 | Straub et al. | |
| 10,159,266 B2 | 12/2018 | Xu | |
| 2002/0187220 A1 | 12/2002 | Luhadiya | |
| 2004/0033293 A1 | 2/2004 | Albert | |
| 2004/0037869 A1 | 2/2004 | Cleverly et al. | |
| 2004/0043115 A1 | 3/2004 | Mendenhall | |
| 2004/0047896 A1 | 3/2004 | Malnoe et al. | |
| 2004/0076731 A1 | 4/2004 | Bourke | |
| 2004/0086616 A1 | 5/2004 | Bassi et al. | |
| 2004/0126462 A1 | 7/2004 | Tepper et al. | |
| 2004/0187794 A1 | 9/2004 | Nakata et al. | |
| 2004/0258776 A1 | 12/2004 | Bohm et al. | |
| 2005/0004279 A1 | 1/2005 | Zanghi et al. | |
| 2005/0008759 A1 | 1/2005 | Nie et al. | |
| 2005/0037108 A1 * | 2/2005 | Lin | A23K 50/42 426/2 |
| 2005/0042331 A1 | 2/2005 | Billmers et al. | |
| 2005/0112272 A1 | 5/2005 | Kao et al. | |
| 2005/0153018 A1 | 7/2005 | Ubbink et al. | |
| 2005/0181097 A1 * | 8/2005 | Townsend | A23K 50/40 426/89 |
| 2006/0067989 A1 | 3/2006 | Denesuk et al. | |
| 2006/0105025 A1 | 5/2006 | Lepple et al. | |
| 2006/0110501 A1 | 5/2006 | Axelrod et al. | |
| 2006/0188611 A1 | 8/2006 | Unlu et al. | |
| 2006/0188632 A1 | 8/2006 | Nie et al. | |
| 2006/0275535 A1 | 12/2006 | Sarneel et al. | |
| 2007/0113796 A1 | 5/2007 | Schildgen et al. | |
| 2007/0148282 A1 | 6/2007 | Zubair et al. | |
| 2007/0154596 A1 | 7/2007 | Sarneel et al. | |
| 2007/0218164 A1 | 9/2007 | Stojanovic | |
| 2007/0224324 A1 | 9/2007 | Debon et al. | |
| 2007/0243299 A1 | 10/2007 | Keller et al. | |
| 2007/0275081 A1 | 11/2007 | Hansen | |
| 2008/0003270 A1 | 1/2008 | Martinez | |
| 2008/0003282 A1 | 1/2008 | Soll et al. | |
| 2008/0038304 A1 * | 2/2008 | Nouvel | A01N 25/28 424/409 |
| 2008/0044538 A1 | 2/2008 | Selse | |
| 2008/0096964 A1 | 4/2008 | Subramanian et al. | |
| 2009/0011086 A1 | 1/2009 | Nielsen | |
| 2009/0104314 A1 | 4/2009 | Dellinger et al. | |
| 2009/0214738 A1 | 8/2009 | Dierking et al. | |
| 2009/0235872 A1 | 9/2009 | Filipi et al. | |
| 2009/0246320 A1 | 10/2009 | Forte et al. | |
| 2009/0280216 A1 | 11/2009 | Fumita | |
| 2009/0297664 A1 | 12/2009 | Forte et al. | |
| 2009/0304897 A1 | 12/2009 | Tedman et al. | |
| 2009/0311390 A1 | 12/2009 | Phelps et al. | |
| 2009/0317509 A1 | 12/2009 | Golding et al. | |
| 2010/0003393 A1 | 1/2010 | Torney et al. | |
| 2010/0034925 A1 | 2/2010 | Pibarot et al. | |
| 2010/0119684 A1 | 5/2010 | Santana et al. | |
| 2010/0143561 A1 | 6/2010 | Marco-Martinez et al. | |
| 2010/0150870 A1 | 6/2010 | Young et al. | |
| 2010/0233756 A1 * | 9/2010 | Sunvold | A23K 40/25 435/34 |
| 2010/0310750 A1 | 12/2010 | She et al. | |
| 2010/0330229 A1 * | 12/2010 | Gelineau | A23K 50/40 426/89 |
| 2011/0052751 A1 | 3/2011 | Karutz et al. | |
| 2011/0139087 A1 | 6/2011 | Lang et al. | |
| 2011/0200721 A1 | 8/2011 | Funda et al. | |
| 2011/0278878 A1 | 11/2011 | Decombaz et al. | |
| 2011/0318455 A1 | 12/2011 | Funda et al. | |
| 2012/0039970 A1 | 2/2012 | Kopsel et al. | |
| 2012/0071563 A1 | 3/2012 | Kopsel | |
| 2012/0093986 A1 | 4/2012 | Bramoulle et al. | |
| 2012/0093994 A1 | 4/2012 | Hsieh et al. | |
| 2012/0156355 A1 | 6/2012 | Milne | |
| 2012/0171336 A1 | 7/2012 | Dixon | |
| 2012/0207907 A1 | 8/2012 | Lanter et al. | |
| 2012/0230928 A1 | 9/2012 | Schaffner et al. | |
| 2012/0259023 A1 | 10/2012 | Hitzfeld et al. | |
| 2012/0277321 A1 | 11/2012 | Le-Thiesse et al. | |
| 2013/0000565 A1 | 1/2013 | Koo et al. | |
| 2013/0104810 A1 | 5/2013 | Shatoff et al. | |
| 2013/0122178 A1 | 5/2013 | Sher et al. | |
| 2013/0171322 A1 | 7/2013 | Schlebusch | |
| 2013/0189397 A1 | 7/2013 | Lertviwatkul et al. | |
| 2013/0203863 A1 | 8/2013 | Le-Thiesse et al. | |
| 2013/0210713 A1 | 8/2013 | Ten Kate et al. | |
| 2013/0236626 A1 | 9/2013 | Brackenridge et al. | |
| 2013/0243932 A1 | 9/2013 | Brackenridge et al. | |
| 2013/0287930 A1 | 10/2013 | Bramoulle et al. | |
| 2013/0295235 A1 | 11/2013 | Albuja et al. | |
| 2013/0309367 A1 | 11/2013 | Pibarot et al. | |
| 2013/0309372 A1 | 11/2013 | Watelain et al. | |
| 2014/0193547 A1 | 7/2014 | Brown et al. | |
| 2014/0242228 A1 | 8/2014 | Nadeau et al. | |
| 2015/0056347 A1 | 2/2015 | Fournier et al. | |
| 2015/0056356 A1 | 2/2015 | Russell-Maynard et al. | |
| 2015/0147454 A1 | 5/2015 | Russell-Maynard | |
| 2015/0327575 A1 | 11/2015 | Yu et al. | |
| 2016/0021905 A1 | 1/2016 | Marangoni | |
| 2016/0081304 A1 | 3/2016 | Nielson et al. | |
| 2016/0082088 A1 | 3/2016 | Ten Kate et al. | |
| 2016/0113242 A1 | 4/2016 | Lacasse | |
| 2016/0219902 A1 | 8/2016 | Chen et al. | |
| 2016/0262352 A1 | 9/2016 | Matsumoto | |
| 2017/0188602 A1 | 7/2017 | Mathe et al. | |
| 2017/0303559 A1 | 10/2017 | Yoshida et al. | |
| 2017/0339981 A1 | 11/2017 | Xu | |

(56) References Cited

U.S. PATENT DOCUMENTS

2018/0042269 A1 2/2018 Ichihashi et al.
2018/0220679 A1 8/2018 Reiser et al.

FOREIGN PATENT DOCUMENTS

| CA | 2862326 A1 * | 8/2013 | ............... A23G 4/10 |
|---|---|---|---|
| EM | 000713250-001 | 5/2007 | |
| EM | 000725064-001 | 6/2007 | |
| EM | 000830583-0001 | 12/2007 | |
| EM | 001669037-0006 | 2/2010 | |
| EP | 1241950 B1 * | 11/2005 | ............. A23K 10/20 |
| IE | 912927 A1 * | 3/1992 | ........... A23L 13/428 |
| WO | WO-2010051120 A1 * | 5/2010 | ............. A23K 20/10 |
| WO | WO 2011/014256 A2 | 2/2011 | |
| WO | WO 2011/091111 A1 | 7/2011 | |

OTHER PUBLICATIONS

"Dahlstrom Roll Form", Internet: http://www.dahlstromrollform.com/pdfcat.ntm, Mar. 2003, PDF p. 23.
"OL' Roy Dog Treats Munchy Bone Mini's", Distributed by Wal-Mart Stores, Inc., 2 pp., downloaded prior to Aug. 12, 2005.
"Original Milk-Bone Brand Treats", Distributed By Kraft Foods North America, 1 p., downloaded prior to Aug. 12, 2005.
"Pedigree Marrobone Brand Dog Treats", Distributed by Masterfoods U.S.A., A Division of Mars, Inc., 3 pp., downloaded prior to Aug. 12, 2005.
"Purina Busy Bone Brand", Distributed by Nestle Purina Petcare Company, 4 pp., downloaded prior to Aug. 12, 2005.
"R.C. Steele Pet Supplies, Jan. 2, 2001, p. 70, Home Pet Shop, Apr. 29, 2000, p. 75".

* cited by examiner

PET FOOD

CROSS-REFERENCE TO RELATED APPLICATIONS

This application is a U.S. National Stage Patent Application under 35 U.S.C. § 371 of International Application No. PCT/GB2018/050231, filed on Jan. 26, 2018, which claims priority to United Kingdom Patent Application Serial No. GB 1701417.6 filed on Jan. 27, 2017, each of which are incorporated by reference in their entireties, and to which priority is claimed.

TECHNICAL FIELD

The present disclosure relates generally to food compositions, more specifically to pet food compositions and/or pet food, such as compositions and/or products, e.g. in the form of treats, for feeding to cats or dogs.

BACKGROUND

The present disclosure relates generally to food compositions, more specifically to pet food compositions and/or pet food products, such as compositions and/or products for feeding to cats or dogs.

High meat content, foods and treats for pets are a desirable commodity for many pet owners. In devising new pet foods, a variety of different factors must be considered, such as factors affecting the likelihood that a pet owner (consumer) will purchase a product for their pet and factors affecting the likelihood that the pet will eat the food, which are not always the same, as explained below.

A key attribute of treats is that they must be highly palatable to the animal to ensure that they are accepted immediately and consumers, that is, the pet owner, are not disappointed.

BRIEF SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

In some embodiments, the present disclosure provides a pet food. The pet food may be a semi-moist, edible pet food, e.g. wherein the pet food has a moisture content of 15 to 50 wt %, optionally from 15 to 40 wt %, optionally from 15 to 30 wt %, optionally from 15 to 25 wt %. The pet food may comprise animal protein, e.g. in an amount of at least 30 wt %. The pet food may comprise a glucose-containing carbohydrate selected from a dextrin and a starch, for example an esterified starch. The pet food may comprise a chelant. The pet food may comprise an emulsifier. The pet food may comprise a core and a coating disposed on the core, the core may comprise animal protein, and optionally the pet food may have an animal protein content of at least 30 wt %, and at least one of the core and the coating comprises a glucose-containing carbohydrate selected from a dextrin and an esterified starch. The pet food may comprise a core and a coating disposed on the core, and the core may comprise animal protein and, optionally the pet food may have an animal protein content of at least 30 wt %, and at least one of the core and the coating comprises a chelant. The pet food may comprise a core and a coating disposed on the core, the core may comprise animal protein, the pet food may have an animal protein content of at least 30 wt %, and/or optionally at least one of the core and the coating comprises an emulsifier.

In some embodiments, the pet food comprises an edible pet food, which may be termed a semi-moist edible pet food, wherein the pet food has a moisture content of 15 to 50 wt % (optionally from 15 to 40 wt %, optionally from 15 to 30 wt %, optionally from 15 to 25 wt %), and the pet food comprises a core and a coating disposed on the core, wherein the core comprises animal protein, the pet food has an animal protein content of at least 30 wt %, and at least one of the core and the coating comprises a glucose-containing carbohydrate selected from a dextrin and an esterified starch.

In some embodiments, there is provided a pet food composition. The pet food composition may or may not have a coating thereon. The pet food composition may comprise any of the components described herein for the pet food in any of the stated amounts. The pet food composition may be for forming a core of a pet food described herein. In some embodiments, there is provided a pet food composition comprising from at least one dextrin; and diacetyl tartaric acid esters of mono- and diglycerides (DATEM), wherein the pet food composition has a moisture content of 15 to 50 wt % (optionally from 15 to 40 wt %, optionally from 15 to 30 wt %, optionally from 15 to 25 wt %). In some embodiments, there is provided a pet food composition comprising from 1-10 wt % of at least one dextrin; and from 0.2-2 wt % of diacetyl tartaric acid esters of mono- and diglycerides (DATEM), wherein the pet food composition has a moisture content of 15 to 50 wt % (optionally from 15 to 40 wt %, optionally from 15 to 30 wt %, optionally from 15 to 25 wt %).

In some embodiments, there is provided a pet food composition comprising: animal protein, calcium bound to a chelant, wherein the pet food composition has (i) a calcium content of at least 100 mg per gram of the composition and (ii) a moisture content of 15 to 50 wt % (optionally from 15 to 40 wt %, optionally from 15 to 30 wt %, optionally from 15 to 25 wt %).

In some embodiments, there is provided an edible pet food, wherein the pet food has a moisture content of 15 to 50 wt % (optionally from 15 to 40 wt %, optionally from 15 to 30 wt %, optionally from 15 to 25 wt %) and the pet food comprises a core and a coating disposed on the core, wherein the core comprises animal protein and calcium bound to a chelant, and the coating comprises a species selected from an emulsifier, a dextrin and an esterified starch.

In some embodiments, there is provided a method of producing an edible pet food composition or an edible pet food. In some embodiments, the method may comprise: combining a meat with one or more components to form a pet food composition, cooking the pet food composition, optionally with steam, and optionally drying the pet food composition, wherein a pet food is formed by the method and the pet food has a moisture content of from 15 to 50 wt % (optionally from 15 to 40 wt %, optionally from 15 to 30 wt %, optionally from 15 to 25 wt %).

In some embodiments, there is provided a method of producing an edible pet food as described herein, wherein the method comprises combining an amount of meat comprising animal protein, an amount of a glucose-containing carbohydrate selected from a dextrin and an esterified starch to form a pet food composition, cooking the pet food composition with steam; drying the pet food composition, and, before or after the drying, applying a coating to the pet food composition to produce a pet food having the pet food composition in a core and the coating disposed thereon, wherein the pet food has a moisture content of 15 to 50 wt % (optionally from 15 to 40 wt %, optionally from 15 to 30 wt %, optionally from 15 to 25 wt %), and pet food has an animal protein content of at least 30 wt %. In an embodiment, the method comprises combining an emulsifier with the amount of meat comprising animal protein and an amount of a glucose-containing carbohydrate to form the pet food composition.

In some embodiments, there is provided a method of producing a pet food, comprising: combining an amount of meat, an amount of a glucose-containing carbohydrate selected from a dextrin and an esterified starch, and an amount of at least one emulsifier to form a pet food composition; cooking the pet food composition with steam; and drying the pet food composition at a temperature of at least 90° C. to create a pet food having a moisture content of from 15 to 50 wt % (optionally from 15 to 40 wt %, optionally from 15 to 30 wt %, optionally from 15 to 25 wt %). In an embodiment, the method further involves, after the cooking and before or after the drying, applying a coating on the pet food product to produce a pet food having a core comprising the pet food product having a coating disposed thereon.

In an embodiment, there is provided use of a component in an edible pet food having a moisture content of 15 to 50 wt % to reduce or prevent bloom formation on its surface, wherein the component is selected from (i) a chelant and (ii) a glucose-containing carbohydrate selected from an esterified dextrin and an esterified starch.

In an embodiment, there is provided use of a component in an edible pet food comprising animal protein to reduce the chewiness and/or firmness of the pet food compared to a pet food lacking the component, wherein the component is selected from (i) a glucose-containing carbohydrate selected from a dextrin and an esterified starch and (ii) an emulsifier, and the pet food has a moisture content of 15 to 50 wt %.

In an embodiment, there is provided use of a component in an edible pet food comprising animal protein to provide the pet food with (a) a resilience measured by Texture Profile Analysis of 0.14 or greater and/or (b) a cohesiveness measured by Texture Profile Analysis of 0.50 or greater, wherein the component is selected from (i) a glucose-containing carbohydrate selected from a dextrin and a starch and (ii) an emulsifier, and the pet food has a moisture content of 15 to 50 wt %.

The edible pet food may be a cat treat (or a plurality of cat treats) or a dog treat (or a plurality of dog treats).

Also provided herein is a pack comprising the edible pet food as described herein. The pack may have an interior chamber, and the chamber may comprise an amount of two or more gases, and wherein the two or more gases comprise at least 60 vol % nitrogen and at least 25 vol % carbon dioxide. The interior chamber may be airtight. The interior chamber may contain the pet food.

The present disclosure provides pet food, which may be in the form of a treat for a cat or a dog.

The present inventors have found that although many dry foods (e.g. having low moisture content—typically less than 15 wt. %), are palatable for cats and many wet foods (high moisture content—e.g. having a moisture content of above 50 wt. % on average) are palatable for cats, many semi-moist food products (e.g. containing approximately 15 to 50 wt. % moisture content) have not been found to be very palatable for cats. The present inventors have found that the intermediate moisture content of a semi-moist food can produce an undesirably chewy/cohesive texture, particularly when the protein content is high. Since the physiology of cats is not suited to chewing as their jaws are shaped for ripping and tearing, this may contribute to the reduced palatability of the semi-moist foods.

The present inventors have found that one method of improving the palatability of semi-moist foods has been to apply a coating (sometimes referred to as a palatant) to the surface of the food to improve its appeal to the animal. However, with high meat content, semi-moist pet foods, this may not provide sufficient palatability.

A further factor is that the preferences of consumers purchasing these treats may differ from those of their pets. The consumer, when purchasing high meat content foods for their animal, typically desires the food have a 'meaty' appearance. This meaty appearance can be enhanced by modulating the moisture content of some food products.

Accordingly, whilst the animal may prefer to eat a pet food containing less moisture, the consumer may prefer to purchase a pet food that appears meatier and, in effect, may contain a higher moisture content. However, the present inventors have found that products of this type with a meaty appearance and a high meat content can have a texture that is unappealing to animals.

In addition to the texture of the product, other factors must be considered. For example, pet foods must also be nutritious. Meat, in particular, is known to provide only limited amounts of vitamins and minerals and thus, in high meat content pet foods, sometimes vitamins and minerals are added to improve the nutritional value of the food. However, the present inventors have found that in some semi-moist foods, particularly those with added minerals, visible, white compounds develop on the surface of semi-moist pet foods over time once the product is in contact with air. This effect is referred to herein as "bloom". It also occurs in semi-moist pet food that does not contain added minerals.

The present inventors have found that the bloom effect is a result of the evaporation of moisture from the food when a packet is opened. Whilst an equilibrium between atmospheric moisture content and the moisture content of the food develop inside the packet, reducing the bloom, the removal of the food from the packaging causes moisture to evaporate due to the strong moisture gradient of the product relative to ambient humidity. This movement of water out of the product transports minerals contained within the product to the surface (efflorescence) where they are deposited, appearing as a white crust. This effect is exacerbated when using a palatant coating on semi-moist products comprising a mixture of fat and phosphates, which promote the conglomeration of the minerals as they are enthalpically incompatible with the high fat environment of the coating.

The present disclosure provides a semi-moist pet food with a texture that has been found to be more palatable to animals, in particular, cats. The pet food is nevertheless be suitable for other animals, such as dogs.

The improved texture may result from the inclusion of at least one dextrin in the pet food. The undesirable (chewy/cohesive) texture was found to be a result of a strong protein structure in the high meat content product. The dextrin interrupts the protein structure, weakening the product and enabling it to be broken apart more easily.

The present improved texture may result from the inclusion of an emulsifier in the pet food. An emulsifier is also able to interrupt the protein structure within the pet food, weakening the product and enabling it to be broken apart more easily.

The present disclosure also provides a semi-moist pet food for which bloom is reduced or prevented. The "reduction" of bloom may indicate that, in a given time period, e.g. 24 hours, 48 hours or 72 hours, the extent of bloom formation in a pet food is reduced, when the pet food is taken from an environment in which the moisture content of the pet food is in equilibrium with its surrounding (e.g. in a sealed pack) and placed in air under ambient conditions e.g. at standard temperature (e.g. 25° C.), standard pressure (100 kPa) and 40% relative humidity. The extent of bloom formation may be measured by the degree of lightening (or whitening) of the pet food during this period. The extent of bloom may also be measured by x-ray microanalysis to detect one or more of the following ions: $K^+$, $Ca^{2+}$, $Na^+$, $CO_3^{2-}$ and $P_3O_{10}^{5-}$.

The reduction or prevention of bloom may result from the inclusion of a chelant in the product. The chelant binds to the minerals, stabilizing them within the structure of the food, significantly reducing the enthalpic impetus for the minerals to migrate to the surface of the food with the water gradient.

The reduction or prevention of bloom may result from the inclusion of a modified starch or dextrin, such as an octenyl succinate hydrolyzed starch in the product, in particular, in a coating on the surface of the product. The modified starch or dextrin binds fat in the coating and alters the polarity. This alters the electrostatic forces acting on the minerals such that the minerals remain dispersed within the fat-containing coating and therefore, the minerals remain as free ions and do not form deposits on the surface. Furthermore, the addition of an modified starch or dextrin, such as octenyl succinate hydrolyzed starch, to the coating improves the appearance of the food from the consumer's perspective, providing a shiny appearance that gives the appearance of meat.

DETAILED DESCRIPTION

Figure 1:
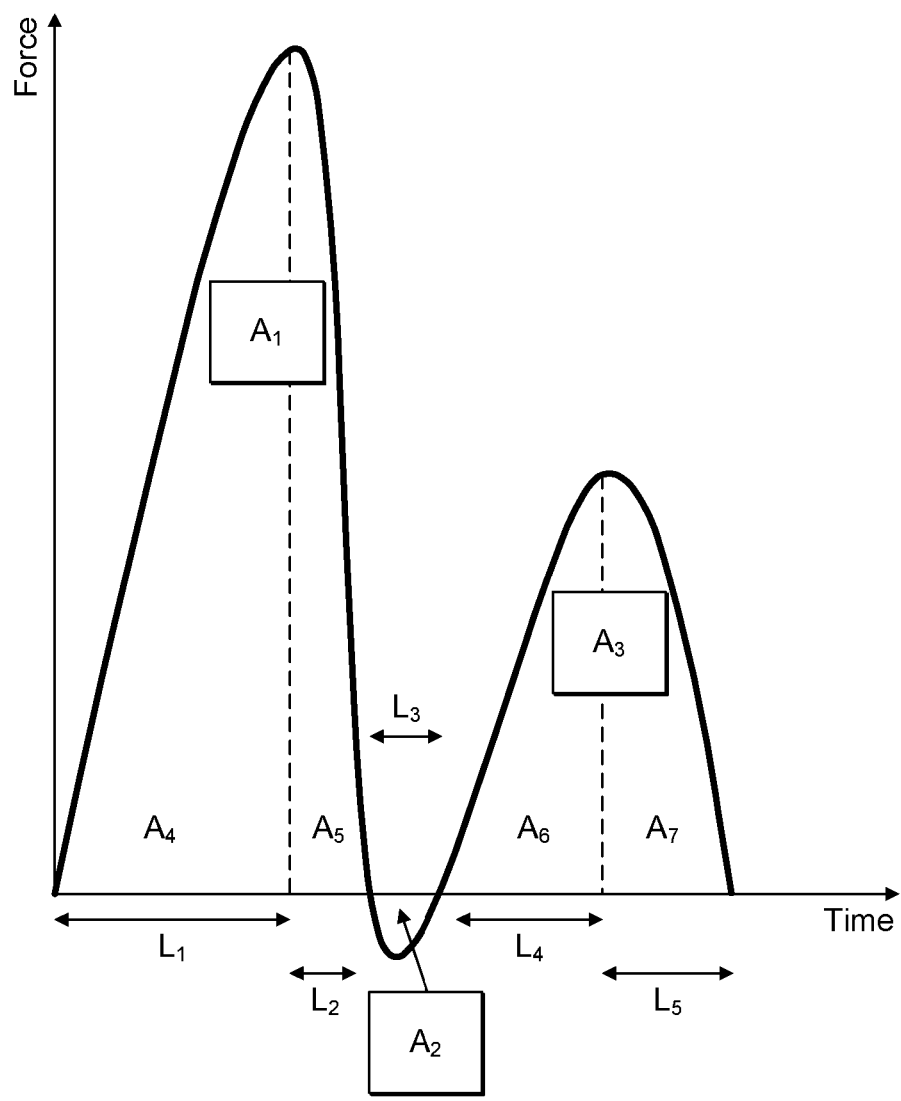
FIG. 1 is a schematic of a Texture Profile Analysis measurement, as described in Example 1 below.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter is illustrated by specific but non-limiting examples throughout this description. The examples may include compilations of data that are representative of data gathered at various times during the course of development and experimentation related to the present invention(s). Each example is provided by way of explanation of the present disclosure and is not a limitation thereon. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

While the following terms used herein are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "an amino acid" may include a plurality of such amino acids, and so forth.

Unless otherwise indicated, all numbers expressing quantities, properties, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

If the pet food is described as comprising a certain amount of a component, this indicates that it is the whole of the pet food, including any core and coating that are present, which comprises the component in the certain amount. For example, if the pet food comprises 5 wt % of component A, this indicates that the whole of the pet food, including the core and coating, if present, comprises the component A in an amount of 5 wt % of the whole pet food.

As used herein, "pet food" means a composition intended for oral consumption to meet one or more nutritional needs of a pet. Pet food expressly excludes items which are capable of being orally ingested but are not intended to be ingested, such as rocks. The pet food may be selected from a treat, chew, biscuit, gravy, supplement, topper, and combinations thereof. The pet food may or may not be nutritionally balanced and complete.

As used herein, "nutritionally balanced" and/or "nutritionally complete" refers to a composition capable of sustaining life as the sole dietary ration for an animal, without the need for any other substance, except possibly water.

All % of a component in a composition, pet food or other item mentioned herein are wt %, i.e. the weight percent of the component in the relevant composition, pet food or other item, unless otherwise stated.

The pet food may be in the form of a treat or a plurality of treats. A treat may be defined as an object having at least one dimension larger than 2 mm and/or at least one dimension smaller than 20 mm. In some embodiments, the pet food has a maximum dimension of 20 mm or less, optionally 17 mm or less, optionally 15 mm or less, optionally 12 mm or less and/or in some embodiments, the pet food has a minimum dimension of at least 2 mm, optionally at least 3 mm, optionally at least 4 mm. The treat may have dimensions, perpendicular to one another, defined as length, width and height, and the height may be from 2 mm to 20 mm, the length may be from 2 mm to 20 mm, and the width may be from 2 mm to 20 mm. The treat may have dimensions, perpendicular to one another, defined as length, width and height, and the height may be from 2 mm to 15 mm, the length may be from 2 mm to 15 mm, and the width may be from 2 mm to 15 mm. The treat may have dimensions, perpendicular to one another, defined as length, width and height, and the height may be from 3 mm to 8 mm, the length may be from 9 mm to 13 mm, and the width may be from 8 mm to 12 mm. A treat may be an object having a relatively consistent cross-sectional shape along one dimension (e.g. its length). The cross sectional shape may be a regular shape, e.g. a triangle, or four-sided shaped, such as a rectangle. The cross-sectional shape may be a non-regular shape, e.g. in the approximate form of a letter, such as an M or a T. The cross-sectional shape may be a regular shape having one or more indentations. The treat may be formed by passing a pet food composition, before cooking, through a shaped nozzle, and then cutting it at into one or more parts along its length.

As used herein, the terms "animal" or "pet" mean a domestic animal including, but not limited to, domestic dogs, cats, horses, cows, ferrets, rabbits, pigs, and the like. In some embodiments, "pet" means a domesticated cat.

As used herein, "meat" may indicate animal flesh suitable for use in a pet food. The meat may be ground and cooked. The meat may be from any suitable animal, for example from a cow, a chicken or a turkey.

All lists of items, such as, for example, lists of ingredients, are intended to and should be interpreted as Markush groups. Thus, all lists can be read and interpreted as items "selected from the group consisting of" . . . list of items . . . "and combinations and mixtures thereof."

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40° C." is intended to mean "about 40° C."

All percentages in the present disclosure are listed as percent by weight on the total weight of the material or mixture, unless explicitly noted otherwise.

Any optional or preferred feature mentioned herein may be combined with any embodiment described herein and/or any other optional or preferred feature.

As mentioned, in some embodiments, the present disclosure provides a pet food. The pet food may be a semi-moist edible pet food, e.g. wherein the pet food has a moisture content of 15 to 50 wt % (optionally from 15 to 40 wt %, optionally from 15 to 30 wt %, optionally from 15 to 25 wt %). The pet food may comprise animal protein, e.g. in an amount of at least 30 wt %. The pet food may comprise a glucose-containing carbohydrate selected from a dextrin and a starch, for example an esterified starch. The pet food may comprise a chelant. The pet food may comprise an emulsifier. The pet food may comprise a core and a coating disposed on the core, and the core may comprise animal protein and the pet food may have an animal protein content of at least 30 wt %, and at least one of the core and the coating comprises a glucose-containing carbohydrate selected from a dextrin and an esterified starch. The pet food may comprise a core and a coating disposed on the core, and the core may comprise animal protein and the pet food may have an animal protein content of at least 30 wt %, and at least one of the core and the coating comprises a chelant. The pet food may comprise a core and a coating disposed on the core, and the core may comprise animal protein and the pet food may have an animal protein content of at least 30 wt %, and at least one of the core and the coating comprises an emulsifier.

In some embodiments, the pet food comprises an edible pet food, wherein the pet food has a moisture content of 15 to 50 wt % (optionally from 15 to 40 wt %, optionally from 15 to 30 wt %, optionally from 15 to 25 wt %) and the pet food comprises a core and a coating disposed on the core, wherein the core comprises animal protein and the pet food has an animal protein content of at least 30 wt %, and at least one of the core and the coating comprises a glucose-containing carbohydrate selected from a dextrin and an esterified starch.

In some embodiments, there is provided a pet food composition comprising from 1-10 wt % of at least one dextrin; and from 0.2-2 wt % of diacetyl tartaric acid esters of mono- and diglycerides (DATEM), wherein the pet food composition has a moisture content of 15 to 50 wt % (optionally from 15 to 40 wt %, optionally from 15 to 30 wt %, optionally from 15 to 25 wt %).

In some embodiments, there is provided a pet food composition comprising: animal protein, calcium bound to a chelant, wherein the pet food composition has (i) a calcium content of at least 100 mg per gram of the composition and (ii) a moisture content of 15 to 50 wt % (optionally from 15 to 40 wt %, optionally from 15 to 30 wt %, optionally from 15 to 25 wt %).

In some embodiments, there is provided an edible pet food, wherein the pet food has a moisture content of 15 to 50 wt % (optionally from 15 to 40 wt %, optionally from 15 to 30 wt %, optionally from 15 to 25 wt %) and the pet food comprises a core and a coating disposed on the core, wherein the core comprises animal protein and calcium bound to a chelant, and the coating comprises a species selected from an emulsifier, a dextrin and an esterified starch.

Glucose-Containing Carbohydrate (Including Modified and Unmodified Dextrins and Starch)

In some embodiments, the glucose-containing carbohydrate is selected from a dextrin and a starch, for example an esterified starch. A starch may be defined as a carbohydrate comprising glucose units linked by glycosidic bonds, and it typically comprises amylose and amylopectin. Starch may comprise, by weight, 20 to 25% amylose and 75 to 80% amylopectin (in the absence of any modification). In the present disclosure the starch may be an unmodified starch or a modified starch. A modified starch may, for example, be an esterified starch.

The dextrin and the starch are optionally modified dextrin or starch. Dextrin may be defined as a carbohydrate that is a polymer of D-glucose units linked by α-(1→4) or α-(1→6) glycosidic bonds. Dextrin may be produced by the hydrolysis of starch. The dextrin, which may be a maltodextrin, may comprise from 3 to 17 glucose units. The dextrin may be selected from maltodextrin, cyclodextrin, amylodextrin, (beta) or (alpha) Limit dextrin. In the present disclosure the dextrin may be an unmodified dextrin or a modified dextrin. A modified dextrin may, for example, be an esterified dextrin. An unmodified dextrin may indicate a dextrin that has not had any substituents, e.g. ester groups, added to it.

The dextrin may have a dextrose equivalent of from 1 to 25, optionally from 1 to 13, optionally from 3 to 20. Dextrose equivalent (DE) is a measure of the amount of reducing sugars present in a sugar product, relative to dextrose (a.k.a. glucose), expressed as a percentage on a dry basis. The dextrose equivalent may be measured by the Lane-Eynon titration, involving the reduction of copper (II) sulfate in an alkaline tartrate solution.

If the pet food comprises a core and a coating, preferably the core comprises an unmodified dextrin. The unmodified dextrin may be selected from maltodextrin, cyclodextrin, amylodextrin, (beta) or (alpha) Limit dextrin. It has been found that unmodified dextrin, particularly maltodextrin, assists in producing a product with favourable texture characteristics, such that the pet food is desirable, e.g. to a cat, and not too chewy or cohesive. For cats, for example, which typically rip and tear food, rather than chewing, the product was found to be acceptable and would not be refused as often as an equivalent food lacking the dextrin. The combination of the glucose-containing carbohydrate is selected, e.g. a dextrin, and an emulsifier was found to be particularly effective in creating a pet food that was not too chewy, despite, in some embodiments, containing a reasonably high amount of animal protein. The glucose-containing carbohydrate and/or the emulsifier may act to interrupt the protein structure in the pet food, to a certain extent, allowing it to be broken apart more easily in an animal's mouth.

In some embodiments, the core comprises the maltodextrin. In some embodiments, the pet food comprises from 1 wt % to 6 wt % maltodextrin. In some embodiments, the pet food comprises from 1.2 to 1.6 wt % maltodextrin, optionally about 1.3 wt %, about 1.4 wt % or about 1.5 wt %

In some embodiments, the present disclosure provides a pet food, wherein the pet food has a moisture content of from 15 wt % to 50 wt % (optionally from 15 to 40 wt %, optionally from 15 to 30 wt %, optionally from 15 to 25 wt %, optionally from 18 wt % to 23 wt %) and comprises at least one dextrin and at least one emulsifier. In some embodiments, the pet food includes maltodextrin and/or DATEM.

Indeed, in some embodiments, the pet food may comprise one or more of the following ingredients: maltodextrin, DATEM, OSA-modified starch and any combination thereof.

Modified dextrins and modified starches, particularly esterified starches and esterified dextrins have been found to be effective in reducing or preventing 'bloom' formation, e.g. when the pet food is removed from a sealed package. When the pet food comprises a core and a coating, the coating preferably comprises a carbohydrate selected from a modified dextrins and a modified starch, more preferably a carbohydrate selected from esterified dextrins and esterified starch. These carbohydrates have been found to be particularly effective in reducing or preventing bloom formation when incorporated into the coating. It is believed that the bloom discoloration may be due to minerals migrating to the surface of the pet food from the core, and the present of these carbohydrates stabilizes the minerals, such that they do not form deposits. The combination of a carbohydrate selected from esterified dextrins and esterified starch and the use of a chelant, particularly when the core comprises the chelant and the coating comprises the esterified dextrin and/or esterified starch, has been found to be particularly effective in reducing or preventing bloom formation in the pet food. The chelant, when bound to a metal ion, slows the metal ion's migration from the core to the coating, but, even when the metal ion reaches the coating, the chelated metal ion is less likely to precipitate and form a deposit.

In an embodiment, the coating comprises a glucose-containing carbohydrate selected from an esterified dextrin and an esterified starch.

In an embodiment, the esterified dextrin or the esterified starch contains an alkyl group having at least 2 carbon atoms, optionally at least 4 carbon atoms, optionally at least 5 atoms, optionally from 2 to 15 atoms, optionally from 5 to 12 atoms, optionally from 6 to 10 atoms, optionally 7, 8 or 9 atoms.

In an embodiment, the esterified dextrin or the esterified starch is the product of the esterification of a dextrin or starch with an alkyl succinic anhydride. In an embodiment, the esterified dextrin or the esterified starch is the product of the esterification of a dextrin or starch with an alkyl succinic anhydride, wherein the alkyl comprises at least 2 carbon atoms, optionally at least 4 carbon atoms, optionally at least 5 atoms, optionally from 2 to 15 atoms, optionally from 5 to 12 atoms, optionally from 6 to 10 atoms, optionally 7, 8 or 9 atoms.

In an embodiment, the glucose-containing carbohydrate is selected from an esterified dextrin and an esterified starch and the glucose-containing carbohydrate constitutes from 0.5 to 10 wt % of the edible pet food, optionally from 1 to 6 wt % of the edible pet food, optionally from 1 to 5 wt % of the edible pet food, optionally from 1 to 4 wt % of the edible pet food, optionally from 2 to 5 wt % of the edible pet food, optionally from 2 to 4 wt % of the edible pet food.

In an embodiment, the coating comprises an amount of at least one octenyl succinate hydrolysed starch, which may also be termed an octenyl succinate maltodextrin.

In an embodiment, the amount of octenyl succinate hydrolysed starch constitutes from 0.5 to 10 wt % of the edible pet food, optionally from 1 to 6 wt % of the edible pet food, optionally from 1 to 5 wt % of the edible pet food, optionally from 1 to 4 wt % of the edible pet food, optionally from 2 to 5 wt % of the edible pet food, optionally from 2 to 4 wt % of the edible pet food.

Chelant

The pet food preferably comprises a chelant. The chelant has been found to assist in reducing or preventing bloom formation. A chelant may be defined as a species capable of forming two or more coordinate bonds with an ion, e.g. a metal ion. The chelant may be a polydentate ligand. In some embodiments, the chelant is bound to a metal atom. The metal atom may be selected from a divalent and a trivalent metal atom. The metal atom may be an atom from Group II and the transition metals (Groups 3 to 12 of the periodic table). The metal atom may be selected from calcium, copper, iron, magnesium, manganese, zinc, sodium and potassium. The chelant is preferably a chelant that binds to calcium.

In an embodiment, if the pet food comprises a core and a coating, preferably at least one of the core and the coating further comprises a chelant. The chelant may be selected from a citrate, an acetate, ethylenediaminetetraacetate (EDTA), a phosphate, sorbitol, a tartrate and a thiosulfate, a gluconate, an oxystearin and a phytate. The citrate may be selected from calcium citrate, citric acid, monoisopropyl citrate, monoglyceride citrate, potassium citrate, sodium citrate, stearyl citrate, trimethyl citrate. The phosphate may be selected from a monophosphate (also termed an orthophosphate), a polyphosphate such as a diphosphate (sometimes termed a pyrophosphate), a metaphosphate (a cyclic phosphate, such as trimetaphosphate). The phosphate may be selected from a calcium phosphate, a sodium phosphate and a potassium phosphate. The acetate may be a calcium acetate. The EDTA may be selected from disodium calcium EDTA and disodium dihydrogen EDTA. The gluconate may be selected from calcium gluconate and sodium gluconate. The tartrate may be selected from calcium tartrate, sodium tartrate, and potassium tartrate. The thiosulphate may be selected from calcium thiosulphate and sodium thiosulphate. Calcium citrate may also be termed tricalcium dicitrate or 2-hydroxy-1,2,3-propane-tricarboxylic acid calcium salt.

Preferably, the chelant is a citrate.

In an embodiment, the pet food comprises at least 1 wt % of at least one citrate. Preferably, the citrate is selected from a calcium citrate, a sodium citrate and any combination thereof. In an embodiment, the pet food, e.g. the core, comprises calcium ions, and optionally at least some of which are bound to a chelant, and optionally the calcium ion content is at least 100 mg per 100 gram of the pet food, optionally at least 200 mg per 100 gram of the pet food, optionally at least optionally at least 500 mg per 100 gram of the pet food, optionally at least 800 mg per 100 gram of the pet food, optionally at least 1 g per 100 gram of the pet food, optionally at least 1.2 g per 100 gram of the pet food.

Emulsifier

In an embodiment, the edible pet food comprises an emulsifier. In an embodiment, the edible pet food comprises a core and a coating, wherein at least one of the core and the coating further comprises an emulsifier. The emulsifier may be present with the glucose-containing carbohydrate is selected from a dextrin and a starch. The emulsifier may be present with maltodextrin.

In an embodiment, the emulsifier has a HLB value of less than 15. In an embodiment, the emulsifier has an HLB value of from 5 to 15, optionally from 6 to 12, optionally from 7 to 11, optionally from 8 to 10.

Optionally, the emulsifier is selected from diacetyl tartaric acid esters of mono- and diglycerides [DATEM], lecithin [LC], mono- and diglycerides [MDG], a stearoyllactate, e.g. sodium stearoyllactate [SSL] and calcium stearoyllactate [CSL], acetyl esters of monoglycerides [AMG], ethoxylated mono- and diglycerides [EMG], glycerol monostearate [GMS], lactyl esters of monoglycerides [LMG], polyglycerol esters [PGE], propylene glycol monostearate [PGMS], polysorbate 60 [PS60], succinyl monoglyceride [SMG], sorbitane monostearate [SPAN 60], sucrose esters [SUE]. Preferably, the emulsifier comprises diacetyl tartaric acid esters of mono- and diglycerides (DATEM). In an embodiment, the core comprises diacetyl tartaric acid esters of mono- and diglycerides (DATEM). In an embodiment, the core comprises maltodextrin and diacetyl tartaric acid esters of mono- and diglycerides (DATEM). In an embodiment, the pet food comprises from 0.5 to 1.1 wt % DATEM.

Cohesiveness and Resilience

The resilience and the cohesiveness of the pet food have been found to be features that influence how readily the pet food is eaten by an animal, such as a cat or dog. The present inventors found that pet foods with certain levels of resilience and cohesiveness were more desirable than others. The following values indicate a food that is desirable, particularly for a cat. The resilience and cohesiveness may be measured by Texture Profile Analysis, for example as described in Example 1 below.

In an embodiment, the pet food has a resilience measured by Texture Profile Analysis of 0.14 or greater, optionally a resilience measured by Texture Profile Analysis of from 0.14 to 0.25, optionally from 0.14 to 0.23, optionally from 0.14 to 0.21, 0.14 to 0.20. In an embodiment, the pet food has a cohesiveness measured by Texture Profile Analysis of 0.50 or greater. In an embodiment, the pet food has a cohesiveness measured by Texture Profile Analysis of from 0.50 to 0.75. In an embodiment, the pet food has a cohesiveness measured by Texture Profile Analysis of from 0.50 to 0.61, optionally from 0.50 to 0.58, optionally from 0.50 to 0.56. In an embodiment, the pet food has a resilience measured by Texture Profile Analysis of 0.14 or greater and a cohesiveness measured by Texture Profile Analysis of 0.50 or greater.

Moisture Content

The moisture content of the pet food may be measured as described in Example 2. The moisture content may be measured in accordance with BS 4401 Pt 3:1997, BS 4401-3:1997, ISO 1442:1997.

In an embodiment, the pet food has a moisture content of 15 to 50 wt %, optionally from 15 to 40 wt %, optionally from 15 to 30 wt %, optionally from 15 to 25 wt %, optionally from 17 to 25 wt %, optionally from 19 to 23 wt %.

Meat and Protein Content

In an embodiment, the pet food comprises at least 50 wt % meat, optionally at least 60 wt % meat, optionally at least 70 wt % meat, optionally at least 80 wt % meat. In an embodiment, the pet food comprises from 50 wt % to 95 wt % meat, optionally from 60 wt % to 95 wt %, optionally from 70 wt % to 95 wt % meat.

Optionally, at least some of the meat comprises organ meat. Optionally, at least 50 wt % of the meat is organ meat. The organ may be selected from liver and heart. Optionally, the pet food comprises at least 50 wt % meat, of which at least 50 wt % is organ meat.

Optionally, at least some of the meat comprises viscera. Optionally, the pet food comprises at least 50 wt % meat, of which at least 15 wt % is viscera.

In an embodiment, the pet food comprises at least 2 wt % blood plasma, optionally at least 3 wt % blood plasma, optionally at least 4 wt % blood plasma, optionally at least 5 wt % blood plasma, optionally at least 6 wt % blood plasma. In an embodiment, the pet food comprises from 2 wt % to 10 wt % blood plasma, optionally 4 wt % to 9 wt % blood plasma, optionally from 5 wt % to 9 wt % blood plasma, 6 wt % to 8 wt % blood plasma. The blood plasma may be from any suitable animal, such as a pig or a cow.

The pet food may have an animal protein content of at least 30 wt %, optionally at least 35 wt %, optionally at least 38 wt %, optionally at least 40 wt %. The pet food may have an animal protein content of from at least 30 wt % to 60 wt %, optionally 30 wt % to 50 wt %, optionally from 35 wt % to 45 wt %, optionally from 38 wt % to 44 wt %. The protein content may be measured using any suitable method, for example the method according to BS 4401 Pt 2: 1980, ISO 937-1978.

Tetrapotassium Pyrophosphate

The pet food, e.g. the core or coating, may comprise a phosphate, e.g. a tetrapotassium pyrophosphate. In an embodiment, the pet food comprises at least about 0.3 wt % tetrapotassium pyrophosphate. This is believed to contribute to weakening the protein structure and producing a more favourable texture for the pet food.

Water Activity

In an embodiment, the water activity (Aw) of the edible pet food is from 0.7 to 0.8.

Other Components

Other possible components of the pet food are described herein. If the pet food comprises a core and a coating, each component may be present in the core and/or the coating.

The edible pet food may comprise at least one humectant. The humectant may be present in the core or the coating, preferably the core. The humectant may act to bind water and prevent movement to the surface of the pet food, helping to reduce or prevent bloom formation. In an embodiment the at least one humectant is selected from glycol, glycerol, pectin, sodium carboxymethyl cellulose (CMC), and any combination thereof.

The pet food may comprises at least one of an amount of yeast, an amount of yeast extract, or a combination thereof.

In some embodiments, a pet food of the present disclosure is designed to be 100% nutritionally complete and balanced for animal nutrition.

In some embodiments, a pet food of the present disclosure may also contain at least one fat, flavor enhancers, preservatives, nutrients, and/or colorants. As used herein fat includes edible oils and preferably will be liquid fat at room temperature. Exemplary fats include corn oil, soybean oil, peanut oil, cottonseed oil, grapeseed oil, sunflower oil, flaxseed oil (and other sources of omega-3 and omega-6 fatty acids), vegetable oil, palm kernel oil, olive oil, tallow, lard, shortening, butter and combinations thereof.

Preferably, the pet food of the present disclosure demonstrates flexibility and elastic properties to reduce chewing time, which is also referred to, variously, as "lasting time." The pet food is designed to break down under minimal chewing. The texture of the pet food ensures proper balance between animal safety and preference.

In some embodiments, the pet food of the present disclosure can be formulated using one or more of the following ingredients: gelatin, wheat protein isolate, glycerin, pea protein, water, potato protein, sodium caseinate, natural poultry flavor, lecithin, minerals (dicalcium phosphate, potassium chloride, magnesium amino acid chelate, calcium carbonate, zinc sulfate, ferrous sulfate, copper sulfate, manganese sulfate, potassium iodide), vitamins (dl-alpha tocopherol acetate [source of vitamin E], L-ascorbyl-2-polyphosphate [source of vitamin C], vitamin B12 supplement, d-calcium pantothenate [vitamin B5], niacin supplement, vitamin A supplement, riboflavin supplement, vitamin D3 supplement, biotin, pyridoxine hydrochloride [vitamin B6], thiamine mononitrate [vitamin B1], folic acid), dried tomato, apple pomace, vegetable oil (preserved with mixed tocopherols), ground flaxseed, dried sweet potato, cranberry fiber, dried cultured skim milk, choline chloride, taurine, decaffeinated green tea extract, carotene, turmeric, and anthocyanins. In certain embodiments, the pet food is a natural pet food.

In some embodiments, a pet food of the present disclosure can include, but is not limited to, protein materials, starch materials, fiber materials, fat materials, mineral materials, vitamin materials, and mixtures and combinations thereof. Protein materials can include, but are not limited to, chicken meal, chicken, chicken by-product meal, lamb, lamb meal, turkey, turkey meal, beef, beef by-product, viscera, fish meal, entrails, and mixtures and combinations thereof.

Starch materials can include, but are not limited to, cereals, grains, corn, wheat, rice, oats, corn grits, sorghum, grain sorghum, wheat bran, oat bran, amaranth, durum wheat, potatoes, tapioca and mixtures and combinations thereof.

Fiber materials can include, but are not limited to, fructooligiosaccharides, beet pulp, mannanoligosaccharides, oat fiber, citrus pulp, carboxymethylcellulose, gums such as gum Arabic guar gum and carrageen, apple and tomato pomaces, citrus fiber, fiber extracts, fiber derivatives, dried beet fiber, distillers dried grain solids, and mixtures and combinations thereof.

Fat materials include, but are not limited to, poultry fat, chicken fat, turkey fat, pork fat, lard, tallow, beef fat, vegetable oils, corn oil, soy oil, cotton pellet oil, rape pellet oil, fish oil, menhaden oil, anchovy oil, palm oil, palm kernel oil, coconut oil, and mixtures and combinations thereof, and partially or fully hydrogenated versions of any of the aforementioned oils. Mineral materials can include, but are not limited to, sodium selenite, monosodium phosphate, calcium carbonate, potassium chloride, ferrous sulfate, zinc oxide, manganese sulfate, copper sulfate, manganese oxide, potassium iodide, cobalt carbonate, and mixtures and combinations thereof. Vitamin materials can include, but are not limited to, choline chloride, vitamin E supplement, ascorbic acid, vitamin A acetate, calcium pantothenate, pantothenic acid, biotin, thiamine mononitrate, vitamin B12 supplement, niacin, riboflavin supplement, inositol, pyridoxine hydrochloride, vitamin D3 supplement, folic acid, vitamin C, and mixtures and combinations thereof.

In one embodiment, a pet food of the present disclosure can comprise additional components including, but not limited to, beef broth, brewers dried yeast, egg, egg product, flax meal, amino acids such as methionine, leucine, lysine, tryptophan, arginine, cysteine, aspartic acid, taurine, and mixtures and combinations thereof.

Coating

In some embodiments, the pet food comprises a core and a coating disposed on the core. The coating may be a layer that covers at least some of the core, optionally all of the core. The coating may cover, for example, at least 10% of the area of the surface of the core, optionally at least 20% of the area of the surface of the core, optionally at least 30% of the area of the surface of the core, optionally at least 40% of the area of the surface of the core, optionally at least 50% of the area of the surface of the core, optionally at least 60% of the area of the surface of the core, optionally at least 70% of the area of the surface of the core, optionally at least 80% by of the area of the surface of the core, optionally at least 90% of the area of the surface of the core, optionally at least 95% of the area of the surface of the core, optionally at least 98% of the area of the surface of the core.

The coating may constitute from 1 wt % to 30 wt % of the pet food, in some embodiments from 5 wt % to 30 wt % of the pet food, e.g. from 10 wt % to 20 wt % of the pet food. The core will typically comprises animal meat comprising protein, and the coating may contain less protein than the core (in terms of wt %) or lack or substantially lack protein, e.g. the coating may comprises 10 wt % or less protein, optionally 5 wt % or less protein, optionally 2 wt % or less protein, optionally 1 wt % or less protein. The coating may comprise fat, e.g. animal fat, which may be selected from poultry fat, chicken fat, turkey fat, pork fat, lard, tallow and beef fat. The coating may comprise at least 10 wt % fat, optionally 20 wt % fat. In an embodiment, the core comprises animal meat comprising protein, and the coating comprises an animal fat, and optionally the core substantially lacks protein. The animal fat, which may be present in the coating, may constitute from 0.1 wt % to 10 wt % of the pet food, optionally from 0.1 wt % to 5 wt % of the pet food, optionally from 0.5 wt % to 5 wt % of the pet food, optionally from 0.5 wt % to 4 wt % of the pet food.

The coating may further comprise a particulate material. The particulate material may comprise a phosphate.

The presence of an animal fat and/or phosphate in the coating has been found to increase the palatability of the pet food. However, it also has an effect of increasing the propensity of the pet food to bloom.

As indicated above, the coating preferably comprises a glucose-containing carbohydrate selected from a dextrin and an starch, preferably a glucose-containing carbohydrate selected from an esterified dextrin and an esterified starch, such as octenylsuccinate hydrolysed starch. The core may further comprise a chelant. These features together assist in reducing or preventing bloom.

In an embodiment, the coating comprises at least one fat and at least one phosphate.

Pack

Also provided herein is a pack comprising the edible pet food described herein. The pack may comprise an interior chamber that is airtight and/or contains less than 10 vol % oxygen, optionally less than 5 vol % oxygen, optionally less than 1 vol % oxygen, optionally less than 0.5 vol % oxygen. The interior chamber may lack or substantially lack oxygen. The interior chamber may comprises an amount of two or more gases, and wherein the two or more gases comprise at least 60 vol % nitrogen and at least 25 vol % carbon dioxide. The interior chamber may comprises a gas selected from nitrogen and oxygen, and optionally a mixture thereof, and the interior chamber may contains less than 10 vol % oxygen, optionally less than 5 vol % oxygen, optionally less than 1 vol % oxygen, optionally less than 0.5 vol % oxygen, and the interior chamber may lack or substantially lack oxygen. The pet food may be present in the interior chamber.

The pack may be formed from suitable materials, e.g. plastic and/or metal.

Methods

In some embodiments, there is provided a method of producing an edible pet food composition or an edible pet food. In some embodiments, the method may comprise: combining a meat with one or more components, e.g. one or more components mentioned herein, to form a pet food composition, cooking the pet food composition, optionally with steam, and optionally drying the pet food composition, wherein a pet food is formed by the method and the pet food has a moisture content of from 15 to 50 wt % (optionally from 15 to 40 wt %, optionally from 15 to 30 wt %, optionally from 15 to 25 wt %).

In some embodiments, there is provided a method of producing an edible pet food as described herein, wherein the method comprises combining an amount of meat comprising animal protein, an amount of a glucose-containing carbohydrate selected from a dextrin and an esterified starch to form a pet food composition, cooking the pet food composition with steam; drying the pet food composition, and, before or after the drying, applying a coating to the pet food composition to produce a pet food having the pet food composition in a core and the coating disposed thereon, wherein the pet food has a moisture content of at least 15 to 50 wt % (optionally from 15 to 40 wt %, optionally from 15 to 30 wt %, optionally from 15 to 25 wt %), and pet food has an animal protein content of at least 30 wt %. In an embodiment, the method comprises combining an emulsifier with the amount of meat comprising animal protein and an amount of a glucose-containing carbohydrate to form the pet food composition.

In some embodiments, there is provided a method of producing a pet food, comprising: combining an amount of meat, an amount of a glucose-containing carbohydrate selected from a dextrin and an esterified starch, and an amount of at least one emulsifier to form a pet food composition; cooking the pet food composition with steam; and drying the pet food composition at a temperature of at least 90° C. to create a pet food having a moisture content of from 15 to 50 wt % (optionally from 15 to 40 wt %, optionally from 15 to 30 wt %, optionally from 15 to 25 wt %). In an embodiment, the method further involves, after the cooking and before or after the drying, applying a coating on the pet food to produce a pet food having a core comprising the pet food having a coating disposed thereon.

IN any embodiment described herein, the drying may be carried out at a temperature of from 90° C. to 110° C., optionally from 95° C. to 105° C. The cooking may be carried out at a higher temperature than the drying, e.g. at a temperature of from at least 120°, optionally at least 130° C., optionally from 150 to 190° C.

The coating may be formed using any suitable method, such as spraying the pet food composition (or core) with, or dipping the pet food composition (or core), into the material that will form the coating.

In some embodiments, there is provided a method of producing an edible pet food as described herein, wherein the method comprises combining an amount of meat comprising animal protein, an amount of a glucose-containing carbohydrate selected from a dextrin and an esterified starch to form a pet food composition, cooking the pet food composition with steam; drying the pet food composition, and, before or after the drying, applying a coating to the pet food composition to produce a pet food having the pet food composition in a core and the coating disposed thereon, wherein the pet food has a moisture content of at least 15 to 50 wt % (optionally from 15 to 40 wt %, optionally from 15 to 30 wt %, optionally from 15 to 25 wt %), and pet food has an animal protein content of at least 30 wt %. In some embodiments, the method comprises combining an emulsifier with the amount of meat comprising animal protein and an amount of a glucose-containing carbohydrate to form the pet food composition. After the combining and before the cooking, the pet food composition may be passed through a nozzle, e.g. a shaped nozzle, and then placed in an oven for the cooking. After the cooking, the composition may be coated with a coating as described herein. The composition or pet food may be cut before or after the cooking, e.g. at certain points along its length, and then coated with a coating as described herein.

One or more further components may be included in the pet food composition, which may form the core of a pet food if a coating is applied, and the one or more further components may be as described herein. If a coating is applied, one or more further components may be included in coating, and the one or more further components may be as described herein.

In any of the embodiments of the method, the dextrin may comprises maltodextrin.

In any of the embodiments of the method, the emulsifier may be selected from diacetyl tartaric acid esters of mono- and diglycerides (DATEM), lecithin, mono- and diglycerides, [a stearoyllactate, e.g. sodium stearoyllactate and calcium stearoyllactate], acetyl esters of monoglycerides [AMG], ethoxylated mono- and diglycerides [EMG], glycerol monostearate [GMS], lactyl esters of monoglycerides [LMG], polyglycerol esters [PGE], propylene glycol monostearate [PGMS], polysorbate 60 [PS60], succinyl monoglyceride [SMG], sorbitane monostearate [SPAN 60], sucrose esters [SUE]

In any of the embodiments of the method, optionally the emulsifier comprises diacetyl tartaric acid esters of mono- and diglycerides (DATEM).

In any of the embodiments of the method, optionally the pet food produced by the method has a resilience measured by Texture Profile Analysis of 0.14 or greater.

In any of the embodiments of the method, optionally the pet food produced by the method has a resilience measured by Texture Profile Analysis of from 0.14 to 0.19.

In any of the embodiments of the method, optionally the pet food produced by the method has a cohesiveness measured by Texture Profile Analysis of 0.50 or greater.

In any of the embodiments of the method, optionally the pet food produced by the method has a cohesiveness measured by Texture Profile Analysis of from 0.50 to 0.75.

In any of the embodiments of the method, optionally the pet food produced by the method has a cohesiveness measured by Texture Profile Analysis of from 0.50 to 0.61.

In any of the embodiments of the method, optionally the pet food produced by the method has a resilience measured by Texture Profile Analysis of 0.14 or greater and a cohesiveness measured by Texture Profile Analysis of 0.50 or greater.

In any of the embodiments of the method, optionally the resilience is from 0.14 to 0.19.

In any of the embodiments of the method, optionally the cohesiveness is from 0.50 to 0.75.

In any of the embodiments of the method, wherein the pet food produced by the method comprises from 1.2 to 1.6 wt % maltodextrin.

In any of the embodiments of the method, the pet food produced by the method from 0.5 to 1.1% DATEM.

In any of the embodiments of the method, the moisture content may be from 19-25 wt %.

In any of the embodiments of the method, the pet food composition and/or pet food produced by the method comprises at least 50 wt % meat. Optionally, the meat comprises at least 50 wt % organ meat. Optionally, the meat comprises at least 15 wt % viscera.

In any of the embodiments of the method, the pet food composition and/or pet food produced by the method further comprises at least about 0.3 wt % tetrapotassium pyrophosphate.

In any of the embodiments of the method, the pet food composition and/or the pet food produced by the method further comprises at least about 1 wt % of at least one citrate. Optionally, the at least one citrate is selected from a calcium citrate, a sodium citrate and any combination thereof.

In any of the embodiments of the method, the Aw of the pet food produced by the method is from 0.7 to 0.8.

In any of the embodiments of the method, the pet food composition and/or the pet food produced by the method further comprises at least one humectant. Optionally, the at least one humectant is selected from glycol, glycerol, pectin, sodium carboxymethyl cellulose (CMC), and any combination thereof.

In any of the embodiments of the method, the pet food composition and/or the pet food produced by the method further comprises at least 6 wt % blood plasma.

In any of the embodiments of the method, the pet food composition and/or the pet food produced by the method further comprises at least one of an amount of yeast, an amount of yeast extract, and a combination thereof.

In any of the embodiments of the method in which a coating is applied, the coating may comprise at least one fat and/or at least one phosphate.

In any of the embodiments of the method in which a coating is applied, the coating may comprise an amount of at least one octenyl succinate hydrolysed starch. The amount of octenyl succinate hydrolysed starch may be from 1 to 4 wt % of the pet food produced by the method.

In any of the embodiments of the method, the method may further comprise packing the pet food in a pack, wherein the pack comprises an airtight interior chamber, and optionally wherein the interior chamber comprises an amount of two or more gases, and wherein the two or more gases comprise at least 60 vol % nitrogen and at least 25 vol % carbon dioxide.

EXAMPLES

FIG. 1 is a schematic of a Texture Profile Analysis measurement, as described in Example 1 below.

Figure 2:
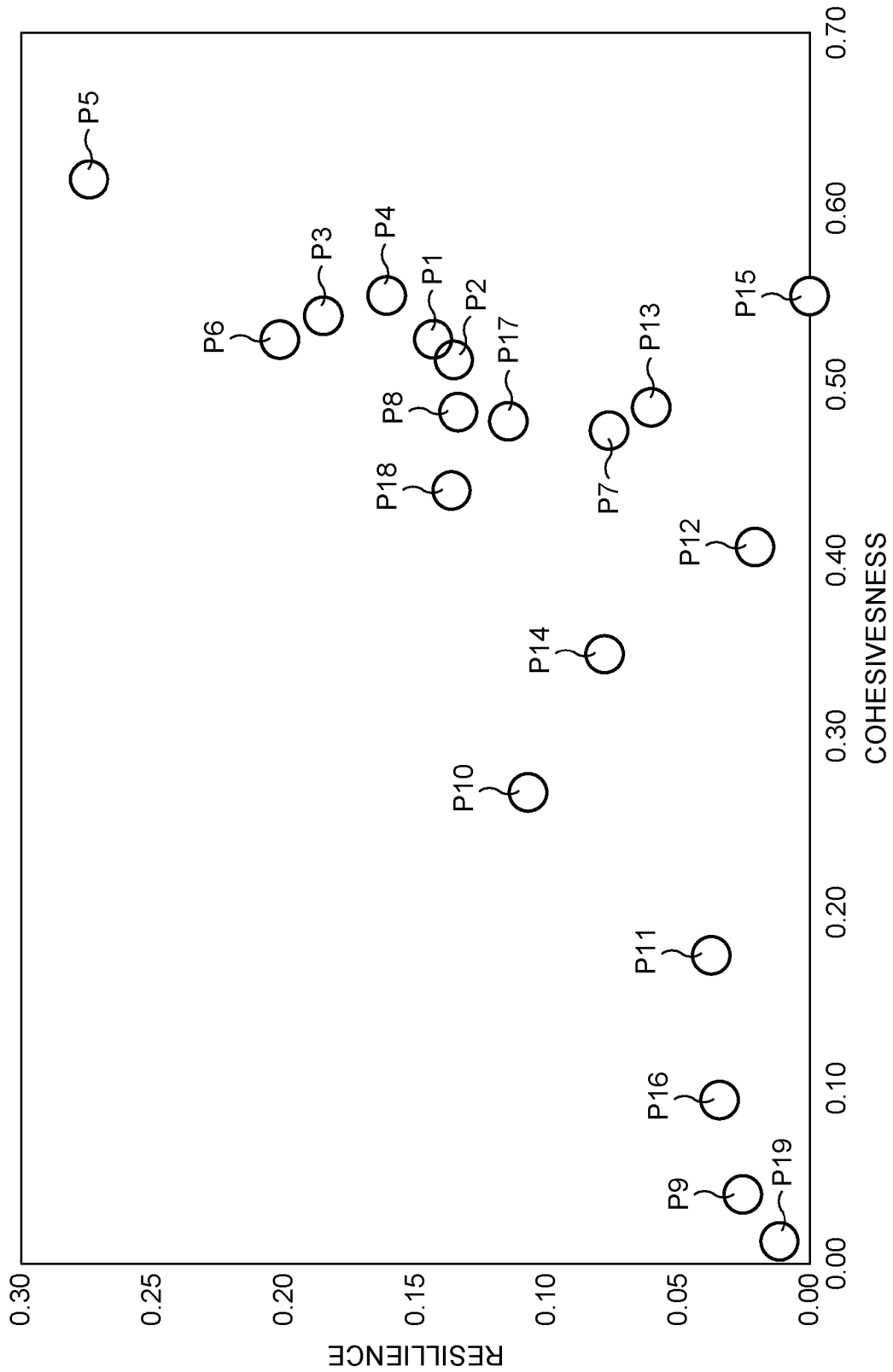
FIG. 2 is a plot of data comparing the properties of examples of a pet food of the present disclosure, as described in Example 4, with commercially available pet foods, and samples of cooked, but unprocessed meat.

FIG. 2 is a plot of data comparing the properties of examples of a pet food of the present disclosure, as described in Example 4, with commercially available pet foods, and samples of cooked, but unprocessed meat.

The following test methods were used to characterise the properties of the novel pet food disclosed herein.

Example 1

Texture Profile Analysis

Texture Profile Analysis (TPA) allows the determination of several parameters that characterise the texture of the sample. The sample is first incubated at 22° C. for 1 hour prior to testing. The samples are tested immediately after removal from the incubator. These samples are laid flat in the center of a flat surface such that the sample is compressed in the longitudinal direction. Using a texture analyser (Stable Micro Systems TA HD Plus) a compression plate of a size sufficient to compress the entire surface of the sample is used to compress the product to 50% strain, or 50% of its overall height at a speed of 1 mm/s. In the case of the 10 mm high sample, the distance to 50% strain is 5 mm. Once the required strain distance is reached, the probe is then moved upwards immediately at rate of 1 mm/s and stops 10 mm above the base plate, the original sample height. After completing the first compression cycle, the compression plate pauses for a period of 5 seconds in which the product, dependent on its material properties can recover some of its original shape and form. The second compression cycle is then carried out. The compression plate is moved down to the distance that was required to achieve 50% strain during first compression (in this case 5 mm) at a speed of 1 mm/s. After reaching the required strain distance, the probe is then moved upwards immediately at rate of 1 mm/s and stops at the original probe height.

A schematic of a Texture Profile Analysis measurement is shown in FIG. 1. As can be seen, the measurement is presented as the force experienced by the probe against time elapsed. This emulates the compression from a first bite, followed by a second bite at the same location and is a well-established technique. With reference to FIG. 1, L1 corresponds to the period during the test in which the probe is moving in the downward direction during the first compression and there is a force measured. L2 corresponds to the period during the test in which the probe is moving in the upward direction during the first compression and a force is measured. L4 corresponds to the period during the test in which the probe is moving in the downward direction during the second compression and a positive force is measured. L5 corresponds to the period during the test in which the probe is moving in the upward direction during the second compression and a positive force is measured.

The first parameter of interest from this measurement is the hardness. This is the peak force of the first compression of the sample. This need not correspond to the point of deepest compression. In the present work, this has also been normalised relative to the area of the sample upon which the platen acts to give a stress value. This value indicates the amount of resistance a tooth would encounter during a biting action. As noted above, a higher stress value can increase the risk of tooth fracture.

The second parameter of interest is cohesiveness. This is a measure of work during the second compression relative to the work during the first compression:

$$\text{Cohesiveness} = \frac{A_3}{A_1}$$

Cohesiveness therefore represents how well the product withstands a second deformation relative to how it behaved under the first deformation and so is a good indication of the ability of the sample to maintain a resistance to subsequent bites and offer a continuing cleaning action for the animal's teeth.

The third parameter of interest is the instantaneous recoverable springiness (IRS), which is a measure of the springback during the first compression:

$$IRS = \frac{L_2}{L_1}$$

IRS is therefore indicative of the springiness of the sample directly after the compressive downstroke.

The fourth parameter is the retarded recoverable springiness (RRS), which is a measure of how well the product physically springs back after it has been deformed during the first compression. The springback is measured at the downstroke of the second compression relative to the first compression:

$$RRS = \frac{L_4}{L_1}$$

Therefore, RRS is indicative of the amount of springback before the second compressive downstroke.

The fifth parameter is the resilience, which is a measure of the area during withdrawal of the first compression relative to the area during the first compressive downstroke:

$$\text{Resilience} = \frac{A_5}{A_4}$$

The resilience is indicative of how much work the sample does in trying to regain its original shape, and so is another indication of the instantaneous springiness of the sample.

The invention(s) is further illustrated by the following examples. It will be appreciated that the examples are for illustrative purposes only and are not intended to limit the invention as described above. Modification of detail may be made without departing from the scope of the invention.

Example 2

Moisture Content

The moisture content (i.e. water content) of the samples is measured using the following procedure. An aluminum dish is dried in an oven at 102±2° C. for at least one hour. The tray is removed from the oven and placed in a desiccator and allowed to cool for at least 30 minutes to reach room temperature. The weight of the dried dish is then recorded (A). 5±0.5 g of sample (e.g. pet food or composition) is placed in the dish and the dish is reweighed to give a combined weight of sample and dish (B). The sample-containing dish is then placed inside an oven held at 102±2° C. for 240 minutes±5 minutes, the time is recorded from the point when the oven has reached equilibrium and the oven door remains closed throughout this time. The sample-containing dish is then removed and placed in a desiccator for 30 minutes and then reweighed to give a final combined weight of dish and sample (C). The moisture content of the sample as a percentage of the total weight of the sample is then given by $$\left(\frac{B-C}{B-A}\right) \times 100.$$

Example 3

The following is an example of a pet food according to the present disclosure.

The semi-moist edible pet food in this Example, in this case a chicken-based product, was prepared using the ingredients shown in Table 1.

TABLE 1

| Component | Ingredients | Wt. % |
|---|---|---|
| M | Chicken organs (liver, hearts, viscera) | 82.85 |
| D | Vitamin mix (including B1, E, B2, B6, B9) | 0.02 |

TABLE 1-continued

| Component | Ingredients | Wt. % |
|---|---|---|
| D | Tetrapotassium pyrophsophate | 0.67 |
| D | Taurine | 0.09 |
| D | Sodium Chloride | 0.89 |
| D | Pork skin protein | 1.04 |
| D | Mineral mixture (including Zn, Fe, Mn, Iodine) | 0.03 |
| D | Copper sulphate | 0.13 |
| D | Choline chloride | 0.32 |
| D | Calcium carbonate | 0.88 |
| D | Blood plasma | 7.35 |
| D | DATEM ester* | 0.84 |
| D | Maltodextrin | 1.52 |
| D | Potassium sorbate | 0.25 |
| L | Antioxidant mixture | 0.03 |
| C | Palatant powder with phosphate | 0.53 |
| C | Palatant liquid | 1.28 |
| C | Fat | 1.28 |

In forming the semi-moist edible pet food, first a core was formed. The core was formulated by preparing a meat emulsion by first grinding the meat components labelled 'M' in Table 1. The meat is frozen at the start of grinding, and gradually defrosts during the grinding, mixing and emulsification steps. Next, the mixture of dry ingredients labelled 'D' and liquid ingredients labelled 'L' were added to the ground meat components labelled 'M' and the composition mixed and emulsified.

To produce beef and turkey products an equivalent recipe was used, where the chicken organs were replaced by beef or turkey organs.

After mixing and emulsification, the core of the pet food is then shaped by pumping the pet food through a shaped nozzle.

The shaped core is then cooked by using a combi-oven, which utilizes a combination of steam and heat to cook the composition at a temperature of about 150° C.-190° C. This procedure sets the shape by protein coagulation. In some cases, the shaped core is then cut to provide the final product shape and size.

The cooked cores are then dried in a drier at 100° C. for approximately 40-50 minutes to reach a moisture content of 18 wt. %. (For beef, the same temperature is used, but the beef is cooked for 70-80 minutes; and for turkey, the same temperature is used, but the turkey is cooked for 75-90 minutes). This provides the core used in the semi-moist edible pet food. While drying at 120° C. made the treats more palatable to cats, the overall appearance of the product was not as desirable.

The coating for the semi-moist edible pet food is formed by combining the C components (palatant powder with phosphate 17.24 wt. % of coating, palatant liquid 41.38 wt. % of coating, animal fat 41.38 wt. % of coating).

The semi-moist edible pet food is then formed by spraying the coating (7.25 wt. % of the pet food) onto the entire surface of the core (92.75 wt. % of the pet food), forming a core and a coating disposed on the core.

The semi-moist edible pet food may then be packaged in a modified atmosphere of nitrogen (70 wt. %) and carbon (30 wt. %).

The texture profile analysis described in Example 1 was performed for this product. The resilience and cohesiveness of the semi-moist edible pet food made from chicken were similar to those found for Example 4.

A consumer screening research study also indicated an improvement in OPE (owner perceived enjoyment) and a reduction in product refusals for cats, compared to products that were very similar, but lacked the maltodextrin and DATEM ester.

The method of cooking using steam described above was also found to improve the palatability of the pet food to cats compared to the same food cooked through boiling (using the so-called 'slice' process).

In further tests, it was found that a level of maltodextrin of 6.5 wt % or below of the whole pet food was preferable, since above 6.5 wt %, the protein structure in the pet food was found to be weakened—the product was not so easily processed, and was observed to break apart during the cooking step.

The content of moisture, protein, fat, calcium, phosphorus, potassium and sodium were similar to the amounts described for Example 4 below.

Example 4

The following is an example of a pet food according to the present disclosure.

The core was prepared as described in Example 3 except that calcium carbonate was replaced with calcium citrate (such that the quantity of calcium ions remained the same in the product to maintain the Ca:P ratio in the product) and maize starch modified hydrolysed sodium octenyl succinate was added to the coating at a sufficient quantity to form 3 wt. % of the overall coating pet food composition. This is included in the coating by combining it with water in a ratio of 50:50 or 55:45 and heating the composition before spraying the coating onto the core at a sufficient quantity to 5.5 or 6 wt. % of the overall pet food composition.

The pet food of Example 4 was compared in tests to a reference pet food that was very similar, except the core contained calcium carbonate (as in Example 3) and coating lacked OSA hydrolysed starch. These modifications to the composition of the core (i.e. the calcium citrate) and coating (i.e. the OSA hydrolysed starch) disposed on the core provided improvements to the appearance of the product. When left in the presence of air, e.g. when removed from a package containing an atmosphere of nitrogen and carbon, it was found that the semi-moist edible reference pet food lost moisture, resulting in the appearance of light-coloured mineral deposits on the surface of the coating (so-called "bloom formation"). This appears to have been a result of migration of the minerals to the surface through moisture loss. The modification of the core and coating as described in Example 4 significantly reduced bloom formation such that, after 24 hours in air, no significant bloom was visible. Moreover, even after 96 hours, no significant bloom was visible. In contrast, the semi-moist edible pet food of Example 3 showed significant bloom after 24 hours.

The feeding performance of the edible pet food of Example 4 (a chicken-based pet food) and similar edible pet foods in which the meat was beef and turkey instead of chicken, was assessed in a 60 cat difference test to ensure they met feeding performance targets. The three types of pet food were tested against a benchmark product (Dreamies Chicken) and met the target of no significant difference at the 95% confidence level.

A consumer study was also conducted to measure owner perceived enjoyment (OPE) and refusals. In this test, 160 cats participated and each cat was fed 3 products—the semi-moist pet food of reference example (CC), a semi-moist pet food of Example 4(CN) and a benchmark product Dreamies Chicken (DC). The objective was to understand whether there was a significant difference perceived between these products by consumers in terms of OPE or refusals. All met the standard of less than 10% refusal. For OPE, there was no significant difference between CN & CC.

Three types of pet foods of Example 4 were produced, each containing a different type of meat—turkey, chicken and beef, respectively. The resilience and cohesiveness of these products were tested and the results are shown in FIG. 2 (P1 indicates a pet food of Example 4 containing turkey, P2 indicates a pet food of Example 4 containing beef, and P3 indicates a pet food of Example 4 containing chicken). In FIG. 2, P4 is a sample of turkey meat (cooked, but otherwise not processed), P5 is a sample of beef meat (cooked, but otherwise not processed), P6 is a sample of chicken meat (cooked, but otherwise not processed). Samples P7 to P19 are commercially available cat foods, generally of the treat variety.

The chicken-based pet food of Example 4 was found to have the following content (per 100 g) of various components:

moisture—19.1 g (as measured in accordance with BS 4401 Pt 3:1997, BS 4401-3:1997, ISO 1442:1997)

protein—42.3 g (i.e. crude protein as measured in accordance with BS 4401 Pt 2: 1980, ISO 937-1978)

fat—13.2% (as measured in accordance with EC 152/2009)

calcium—1.05 g (as measured using inductively coupled plasma optical emission spectrometry (ICP-OES))

phosphorus—0.738 g (as measured using inductively coupled plasma optical emission spectrometry (ICP-OES))

potassium—1.4 g sodium—1.20 g (for this test, the sample is microwave digested in acid and determined by ICP-OES).

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any disclosure disclosed or claimed herein or that it alone, or in any combination with any other reference or references, teaches, suggests or discloses any such disclosure. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure. Furthermore, the foregoing description is for the purpose of illustration only, and not for the purpose of limitation.

One of ordinary skill in the art will recognize that additional embodiments or implementations are possible without departing from the teachings of the present disclosure or the scope of the claims which follow. This detailed description, and particularly the specific details of the exemplary embodiments and implementations disclosed herein, is given primarily for clarity of understanding, and no unnecessary limitations are to be understood therefrom, for modifications will become obvious to those skilled in the art upon reading this disclosure and may be made without departing from the spirit or scope of the claimed invention(s).

The invention claimed is:

1. An edible pet food, comprising:
   a core, wherein the core comprises a chelant and animal protein; and
   a coating disposed on the core, wherein the coating comprises an esterified dextrin and an esterified starch, wherein the edible pet food is semi-moist with:
   a) a moisture content of 15 to 50 wt %;
   b) an animal protein content of at least 30 wt %;
   c) a blood plasma content of at least 6 wt %; and
   d) an emulsifier selected from the group consisting of diacetyl tartaric acid esters of mono- and diglycerides, lecithin, mono- and diglycerides, a stearoyllactate, acetyl esters of monoglycerides, ethoxylated mono- and diglycerides, glycerol monostearate, lactyl esters of monoglycerides, polyglycerol esters, propylene glycol monostearate, polysorbate 60, succinyl monoglyceride, sorbitane monostearate, and sucrose esters.

2. The edible pet food of claim 1, wherein the dextrin comprises maltodextrin.

3. The edible pet food of claim 1, wherein the pet food has a resilience measured by Texture Profile Analysis of 0.14 or greater.

4. The edible pet food of claim 1, wherein the pet food has a cohesiveness measured by Texture Profile Analysis of 0.50 or greater.

5. The edible pet food of claim 1, the pet food comprising at least 50 wt % meat.

6. The edible pet food of claim 1, further comprising at least about 0.3 wt % tetrapotassium pyrophosphate.

7. The edible pet food of claim 1, wherein the coating further comprises a chelant.

8. The edible pet food of claim 1, wherein the coating comprises an amount of at least one octenyl succinate hydrolysed starch.

9. The edible pet food of claim 1, wherein a water activity (Aw) of the edible pet food is from 0.7 to 0.8.

10. The edible pet food of claim 1, further comprising at least one humectant.

11. The edible pet food of claim 1, further comprising at least one of an amount of yeast, an amount of yeast extract, or a combination thereof.

12. The edible pet food of claim 1, wherein the coating comprises a component selected from at least one fat and at least one phosphate.

13. The edible pet food of claim 1, wherein the glucose-containing carbohydrate constitutes from 0.5 to 10 wt % of the edible pet food.

14. The edible pet food of claim 1, wherein the chelant is a citrate chelant.

* * * * *